(12) United States Patent
Venkat et al.

(10) Patent No.: US 10,300,873 B2
(45) Date of Patent: May 28, 2019

(54) MODULAR BUMPER BEAM

(71) Applicant: SABIC GLOBAL TECHNOLOGIES B.V., Bergen op Zoom (NL)

(72) Inventors: Somasekhar Bobba Venkat, Bangalore (IN); Dhanendra Kumar Nagwanshi, Farmington Hills, MI (US); Srikant Sekhar Padhee, Bangalore (IN)

(73) Assignee: SABIC Global Technologies B.V., Bergen Op Zoom (NL)

( * ) Notice: Subject to any disclaimer, the term of this patent is extended or adjusted under 35 U.S.C. 154(b) by 0 days.

(21) Appl. No.: 15/514,594

(22) PCT Filed: Nov. 25, 2015

(86) PCT No.: PCT/IB2015/059130
§ 371 (c)(1),
(2) Date: Mar. 27, 2017

(87) PCT Pub. No.: WO2016/084020
PCT Pub. Date: Jun. 2, 2016

(65) Prior Publication Data
US 2017/0253204 A1  Sep. 7, 2017

Related U.S. Application Data

(60) Provisional application No. 62/084,005, filed on Nov. 25, 2014.

(51) Int. Cl.
*B60R 19/34* (2006.01)
*B60R 19/18* (2006.01)

(52) U.S. Cl.
CPC .............. *B60R 19/18* (2013.01); *B60R 19/34* (2013.01); *B60R 2019/186* (2013.01);
(Continued)

(58) Field of Classification Search
CPC ................... B60R 19/18; B60R 19/34; B60R 2019/1813; B60R 2019/1833;
(Continued)

(56) References Cited

U.S. PATENT DOCUMENTS 6,099,055 A  8/2000 Hirota et al.
6,609,740 B2  8/2003 Evans
(Continued)

FOREIGN PATENT DOCUMENTS

CN  102806878 A  12/2012
EP  2441626 A2  4/2012
FR  2810941 A1  1/2002

OTHER PUBLICATIONS

English Abstract of Chinese Application No. 102806878 A; dated Dec. 5, 2012; 1 Page.
(Continued)

*Primary Examiner* — Lori L Lyjak
(74) *Attorney, Agent, or Firm* — Cantor Colburn LLP (57) ABSTRACT

An energy absorber for a vehicle, comprising: a continuous beam to extend across a width of vehicle, the beam defining a plurality of inward facing cavities in a center section, with adjacent inward facing cavities separated from one another by an inward facing rib, and at each end portion a plurality of outward facing cavities, with adjacent outward facing cavities separated from one another by an outward facing rib, wherein the center section includes a panel that is continuous on its outward side, and that forms a relative bottom of each of the plurality of inward facing cavities with its inward face.

18 Claims, 6 Drawing Sheets

(52) U.S. Cl.
CPC ............... *B60R 2019/1813* (2013.01); *B60R 2019/1833* (2013.01); *B60R 2019/1846* (2013.01); *B60R 2019/1853* (2013.01); *B60R 2019/1866* (2013.01)

(58) Field of Classification Search
CPC .... B60R 2019/1846; B60R 2019/1853; B60R 2019/186; B60R 2019/1866
See application file for complete search history.

(56) References Cited

U.S. PATENT DOCUMENTS

| | | | |
|---|---|---|---|
| 8,505,990 B2 | 8/2013 | Czopek et al. | |
| 8,684,427 B2* | 4/2014 | Marur | B60R 19/18 293/102 |
| 2005/0029822 A1 | 2/2005 | Lee | |
| 2012/0112479 A1* | 5/2012 | Nagwanshi | B60R 19/34 293/133 |
| 2013/0154285 A1 | 6/2013 | Jeong et al. | |
| 2013/0328351 A1 | 12/2013 | Gonin | |

OTHER PUBLICATIONS

International Search Report for International Application No. PCT/IB2015/059130; filed Nov. 25, 2015; dated Feb. 23, 2016; 5 Pages.
Machine Translation of EP2441626(A1); Date of Publication: Apr. 18, 2012; 12 Pages.
Machine Translation of FR2810941(A1); Date of Publication: Jan. 4, 2002; 7 Pages.
Written Opinion of the International Searching Authority for International Application No. PCT/IB2015/059130; filed Nov. 25, 2015; dated Feb. 23, 2016; 5 Pages.

* cited by examiner

MODULAR BUMPER BEAM

CROSS REFERENCE TO RELATED APPLICATIONS

This application is a 371 of International Application No. PCT/M2015/059130, filed Nov. 25, 2015, which claims priority to U.S. Application Ser. No. 62/084,005, filed Nov. 25, 2014 which are incorporated herein by reference in their entirety.

BACKGROUND

There is an increasing emphasis on reducing damage in automobile collisions. In the case of low speed collisions, energy absorbers can be used in conjunction with a vehicle frame and can absorb the energy to reduce vehicle damage.

Varying performance requirements for vehicles have been established by organizations such as the United States Federal Motor Vehicle Safety Standard (FMVSS), Insurance Institute for Highway Safety (IIHS), the Research Council for Automobile Repairs (RCAR), and the United Nations Economic Commission for Europe (UNECE, or less formally ECE). Regulations governing the low-speed damageability requirements for automobiles across the globe are different. For example, in Europe and the Pacific region, vehicles have to meet ECE 42 (ECE Regulation No. 42) and RCAR standards at both the front and rear side of the vehicle. In the U.S., vehicles have to pass FMVSS part 581, RCAR & IIHS deformable barrier impact tests.

For an automobile manufacturer, or a supplier, it is important to develop a cost-effective solution capable of meeting multiple requirements. Accordingly, bumper beams and energy absorbers that can meet safety standards, are lightweight, and can be manufactured in a cost-effective manner are desired.

BRIEF DESCRIPTION

One embodiment is directed to an energy absorber for a vehicle, comprising a continuous beam to extend across a width of vehicle, the beam defining a plurality of inward facing cavities in a center section, with adjacent inward facing cavities separated from one another by an inward facing rib, and at each end portion a plurality of outward facing cavities, with adjacent outward facing cavities separated from one another by an outward facing rib, wherein the center section includes a panel that is continuous on its outward side, and that forms a relative bottom of each of the plurality of inward facing cavities with its inward face.

Another embodiment is directed to a corner energy absorber comprising: an upper wall; a lower wall; a longitudinal rib disposed between the upper wall and lower wall; wherein the longitudinal rib does not intersect at least one of the upper wall and the lower wall; a lateral rib extending between the upper wall and the lower wall, and intersecting the longitudinal rib; and a surface that intersects the upper wall, the lower wall, the longitudinal rib, and the lateral rib and forms a crush box; wherein the surface extends along a first side along an end section; wherein the surface crosses from the first side to a second side along a transition section; wherein the transition section comprises one or more crush boxes on both sides of the surface that have open sides facing away from one another; wherein the energy absorber is formed as a single article; and wherein the energy absorber is configured for attachment to a vehicle.

Still another embodiment is directed to an energy absorber comprising: an upper wall; a lower wall; a longitudinal rib disposed between the upper wall and lower wall; wherein the longitudinal rib does not intersect the upper wall or the lower wall; a lateral rib extending between the upper wall and the lower wall, and intersecting the longitudinal rib; and a surface that intersects the upper wall, the lower wall, the longitudinal rib, and the lateral rib and forms a crush box; wherein the surface extends along a first side along each of two end sections; wherein the surface crosses from the first side to a second side along each of two transition sections adjacent the end sections; wherein the surface extends along the second side along a center section; wherein the transition section comprises one or more crush boxes on both sides of the surface that have open sides facing away from one another; wherein the energy absorber is formed as a single article; and wherein the energy absorber is configured for attachment to a vehicle.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

The modular energy absorber described herein can be used to meet varying performance requirements (e.g., for vehicles of different weight, geographically differing regulations, standards, and the like). This modular energy absorber can advantageously include energy absorbing modules which can be removed from, or not present in, the energy absorber for certain markets (e.g., where performance requirements are less stringent). For example, low weight vehicles can include only sections (e.g., corner sections) of this modular energy absorber. Thus, the standard, modular energy absorber design described herein can allow for customization to meet market and/or regulatory demands, while offering the benefits of a standardized design.

This energy absorber for a vehicle can include a corner energy absorber and a center energy absorber. The center energy absorber can be used in markets, and/or vehicle classes, where standards or regulations dictate higher energy absorption capability and/or lower intrusion (e.g., in ECE 42 center pendulum impact test), while in other markets, and/or vehicle classes, an energy absorbing system free of the center energy absorbing section (e.g., where only a corner energy absorber is used) can be employed. This modularity allows for customization while retaining the benefits of high volume manufacturing techniques.

The energy absorber can be attached to a vehicle. For example, the energy absorber can be attached to a structural element of the vehicle including, but not limited to the vehicle chassis, frame, side rail, body in white (BIW), body in black (BIB), frame extension, bumper beam, bumper plate, or a combination including at least one of the foregoing. In an embodiment, the energy absorber can be attached to the vehicle rails (e.g., can include two corner energy absorbers attached to the vehicle side rails).

The energy absorber can be attached to the vehicle using any mechanical fastener, such as including, but not limited to, a bolt, screw, rivet, interlocking connection, snap, weld, or the like. The energy absorber can be covered by a decorative fascia to enhance the aesthetic of the vehicle without detracting from its crashworthiness.

Figure 1:
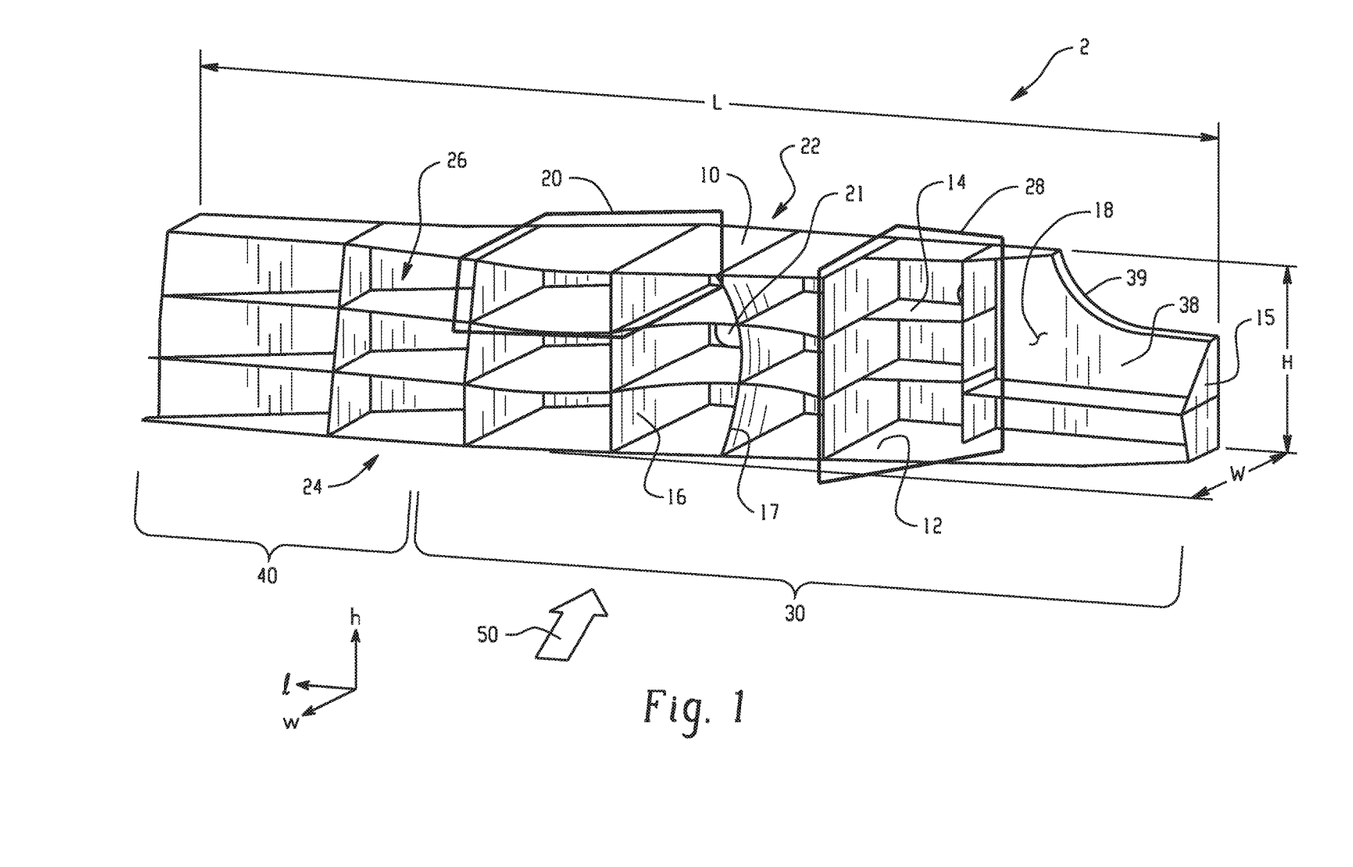
FIG. 1 is an illustration of a corner energy absorber from the impact side.
Figure 2:
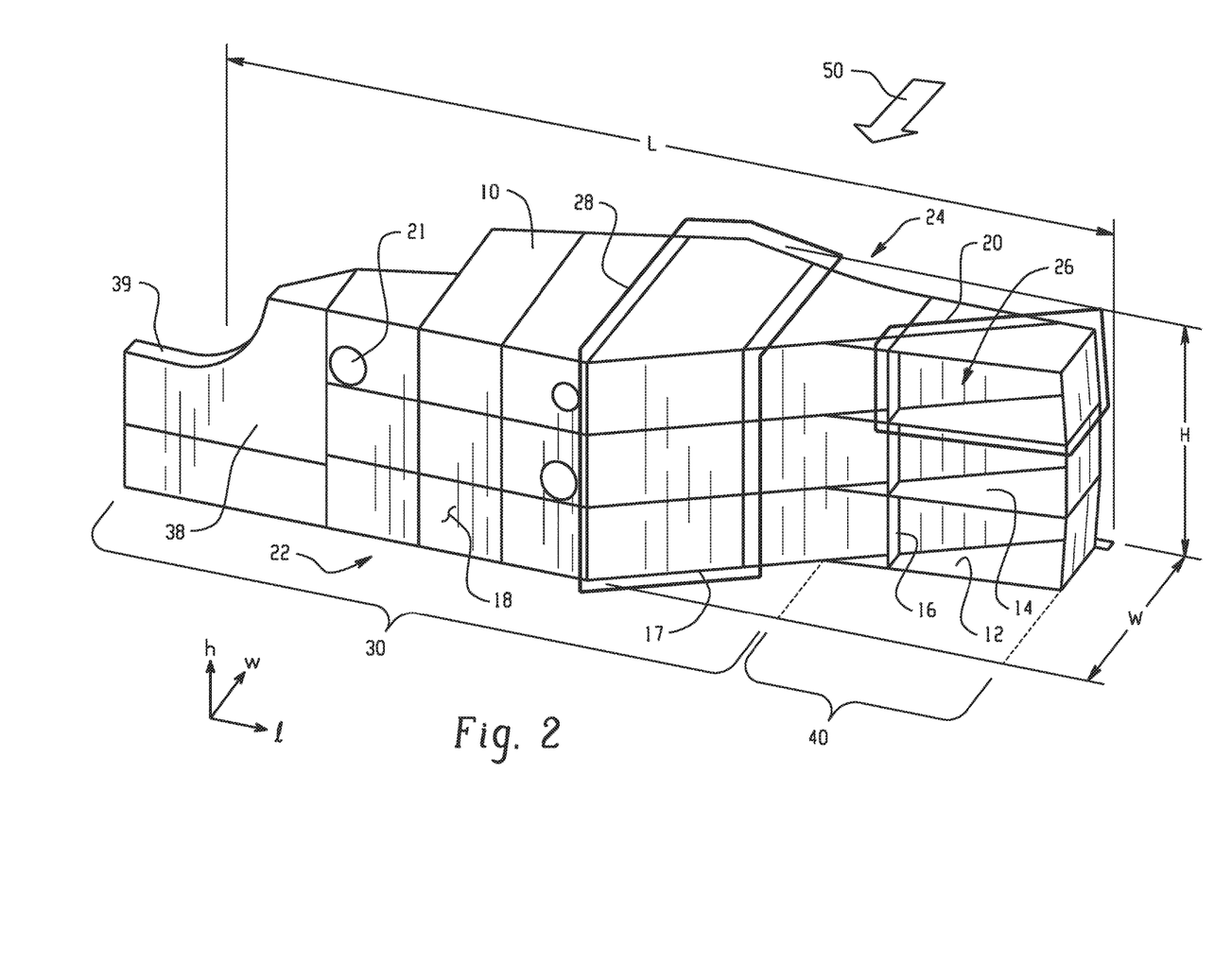
FIG. 2 is an illustration of the corner energy absorber shown in FIG. 1 from the mounting side.

FIGS. 1 and 2 are illustrations of a corner energy absorber 2 which can include an upper wall 10, a lower wall 12, a longitudinal rib 14, a lateral rib 16, and a surface 18. The longitudinal rib 14 can be disposed between the upper wall 10 and lower wall 12 such that it does not intersect at least one of the upper wall 10 and the lower wall 12. The lateral rib 16 can extend between the upper wall 10 and the lower wall 12, and can intersect the longitudinal rib 14. The lateral rib 16 can be perpendicular to the longitudinal rib 14. The lateral rib 16 can separate the corner energy absorber 2 into segments 28. The surface 18 can intersect the upper wall 10, the lower wall 12, the longitudinal rib 16, and the lateral rib 16 and can form a crush box 20. The surface 18 can extend along a first side 22 along an end section 30.

The corner energy absorber 2 can have a length (L) measured in the l-axis dimension, a height (H) measured in the h-axis dimension, and a width (W) measured in the w-axis dimension. Any one of the height, width, or length dimensions of the corner energy absorber 2 can vary along at least one of the other two dimensions. For example the height of the corner energy absorber 2 can change along its length and/or its width (e.g., H can be a function of the l-axis dimension and or the w-axis dimension).

The surface 18 can cross from the first side 22 to the second side 24 along a transition section 40. A second side 24 of the corner energy absorber 2 can include an open side 26 of the crush box 20. The open side 26 of the crush box 20 can face a direction of impact 50. The transition section 40 can include one or more crush boxes 20 formed on both sides of the surface 18, such that their open side 26 faces away from one another (e.g., face in opposite directions). The transition section 40 can include one or more lateral ribs 16. The lateral ribs 16 of the transition section 40 can extend from either side of the surface 18 (e.g., extending towards the first side 22, towards the second side 24, or both). The transition section 40 can include one or more segments 28.

Figure 7:
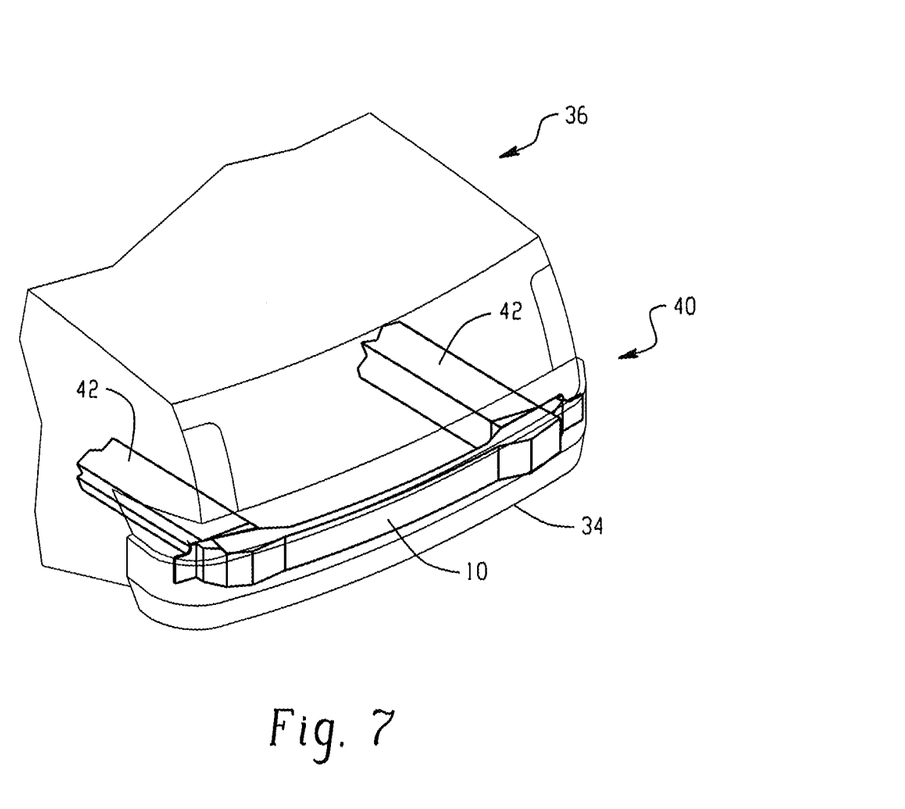
FIG. 7 is a cut away perspective view of an energy absorber attached to vehicle rails.

A segment 28 can include one or more crush boxes 20. A segment 28 can include a longitudinal rib 14 which is offset (e.g., at a different position along at least one of the h-axis or the w-axis in the attached figures) from the longitudinal rib 14 of another segment 28. The lateral rib 16 can have any shape, e.g., an edge 17 of the lateral rib 16 can have a concave shape. In an embodiment, an end segment 38 can include a longitudinal rib 14 which is offset (e.g., at a different position along the h-axis) from the longitudinal rib 14 of another segment 28. In an embodiment, an end segment 38 can include a single longitudinal rib 14. In an embodiment, an end segment 38 can include a single lateral rib 16, such that an upper wall 10 and/or a lower wall 12 form a triangular shape between the surface and the lateral rib (e.g., as in an w-1 plane). In an embodiment, the end segment 38 can include an end wall 15 that intersects the surface 18, the longitudinal rib 14, the upper wall 10, the lower wall 12, or a combination including at least one of the foregoing. In an embodiment, the surface 18 can include a shaped portion 39 along an end segment 38. The shaped section 39 can have any shape. The upper wall 10 along the shaped section 39 can have a smaller width in comparison to the upper wall 10 along the remainder of the corner energy absorber 2 and/or in comparison to the lower wall 12. Shaping the corner energy absorber 2 can allow for a fascia to cover the corner energy absorber 2 when it is coupled to a vehicle while retaining a desired aesthetic and/or energy absorption functionality. See FIG. 7 wherein the fascia 34 is disposed over the energy absorber which is attached to the vehicle rails 42 for vehicle 36.

The surface 18 can be recessed in the width dimension (e.g., w-axis dimension) such that the upper wall 10, the lower wall 12, the longitudinal rib 14, the lateral rib 16, or a combination including at least one of the foregoing extends toward both the first side 22 and the second side 24. In this way, the surface 18 can be offset a distance from the edge of the corner energy absorber 2 (e.g., where the surface is not disposed at W=0 or at W=W of the width dimension in a selected cross section taken along a w-h plane).

The corner energy absorber 2 can be integrally formed as a single article in any suitable process, such as injection molding, insert molding, over molding, and the like. The corner energy absorber 2 can be configured for attachment to a vehicle (not shown in the attached figures). The first side 22 can be a mounting side which can abut a structural element of a vehicle (e.g., chassis, frame, side rail, BIW, BIB, frame extension, bumper beam, bumper plate, and the like) when the corner energy absorber 2 is attached to the vehicle. The corner energy absorber 2 can include an opening 21 which can form a hole there through for extending a fastener through and attaching the corner energy absorber 2 to a structural element of a vehicle (e.g., chassis, frame, rail, and the like). In an embodiment, the width of at least one of the upper wall (10) and the lower wall (12), as measured along the w-axis dimension, is less than the width (W) of the corner energy absorber 2. In an embodiment, the width (W) of the corner energy absorber 2 varies along at least one of the length (L) of the corner energy absorber 2 and the height (H) of the corner energy absorber 2. In an embodiment, a vehicle can include two corner energy absorbers 2 attached to the vehicle on either corner of an end of the vehicle (e.g., front end or rear end). In an embodiment, a set of two corner energy absorbers 2 for attachment to a vehicle can be identical (e.g., made using the same mold), can be chiral (e.g., the two can be mirror images of one another that cannot be superimposed), or each can be geometrically different (e.g., where the two cannot be viewed as mirror images of one another).

Figure 3:
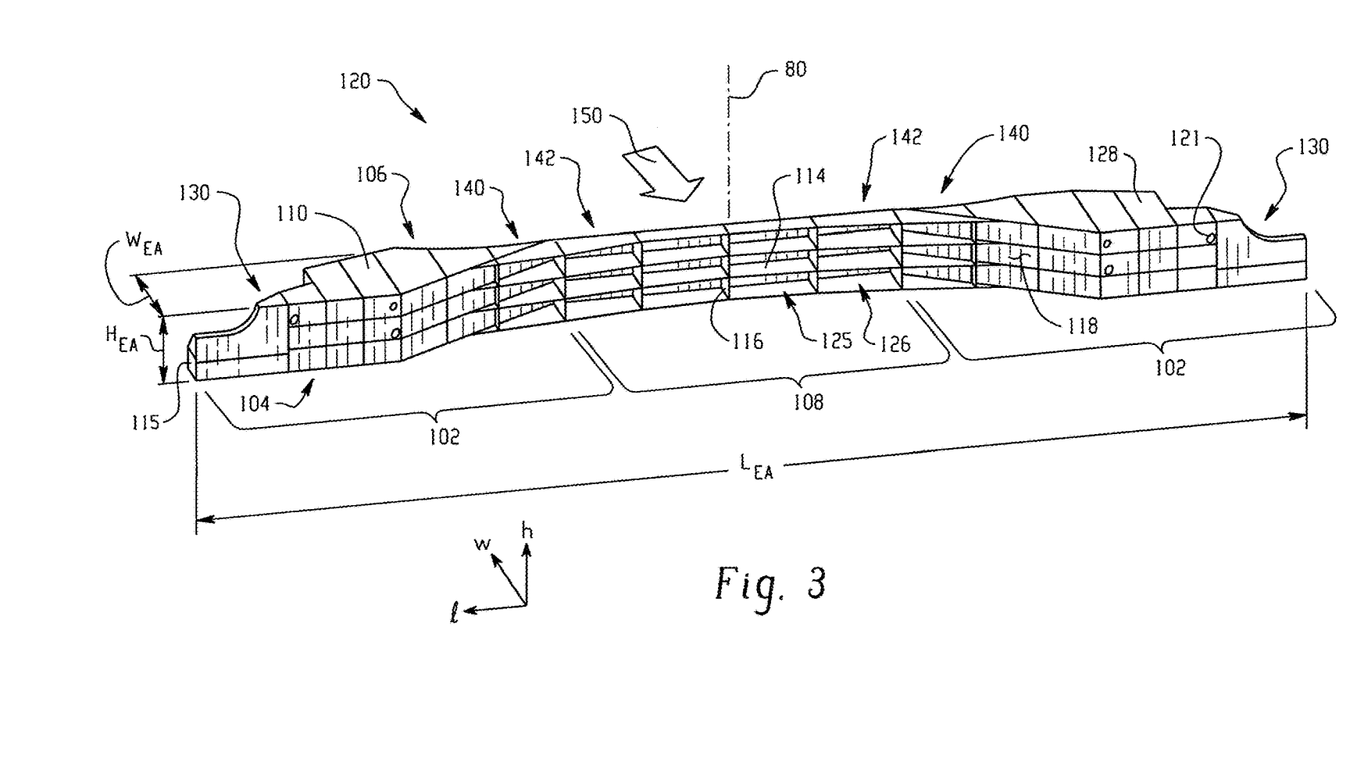
FIG. 3 is an illustration of an energy absorber that includes a center section and two corner sections from the mounting side.
Figure 4:
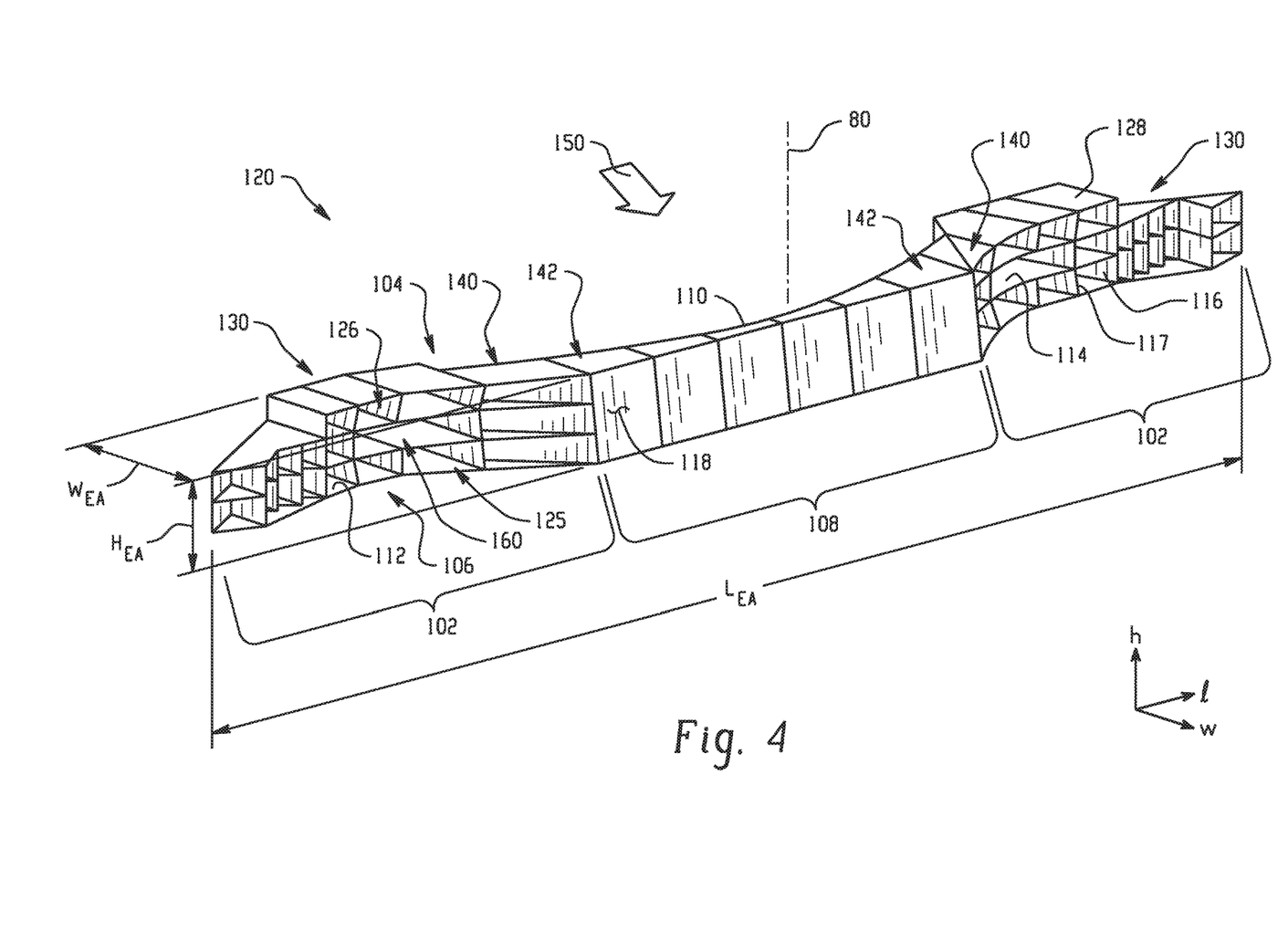
FIG. 4 is an illustration of an energy absorber from the impacting side.

FIGS. 3-4 are illustrations of an energy absorber 120 having a length ($L_{EA}$) measured in the l-axis dimension, a height ($H_{EA}$) measured in the h-axis dimension, and a width ($W_{EA}$) measured in the w-axis dimension. Any one of the height, width, or length dimensions of the energy absorber 120 can vary along at least one of the other two dimensions. For example the width of the energy absorber 120 can change along its length and/or its height (e.g., W can be a function of the l-axis dimension and or the h-axis dimension).

The energy absorber 120 can include two corner energy absorbers 102 and a center section 108. The center section 108 can be disposed between the two corner energy absorbers 102. The center section 108 can include two longitudinal ends 142 which can be coupled to (e.g., formed together with, attached to, or the like) the transition sections 140 of the corner energy absorbers 102.

The energy absorber 120 can include an upper wall 110, a lower wall 112, a longitudinal rib 114, a lateral rib 116, and a surface 118. The longitudinal rib 114 can be disposed between the upper wall 110 and lower wall 112 such that it does not intersect at least one of the upper wall 110 and the lower wall 112. The lateral rib 116 can extend between the upper wall 110 and the lower wall 112, and can intersect the longitudinal rib 114. The lateral rib 116 can be perpendicular to the longitudinal rib 114. The lateral rib 116 can separate the energy absorber 120 into segments 128.

The surface 118 can intersect the upper wall 110, the lower wall 112, the longitudinal rib 114, and the lateral rib 118 and can form a crush box 125. The surface 118 can extend along a first side 104 along an end section 130 of the corner energy absorber 102. The surface can extend along a second side 106 along the center section 108 of the energy absorber 120. The surface 118 can cross from the first side 104 to the second side 106 along a transition section 140 of the energy absorber 120. The second side 106 of the corner energy absorber 102 can include an open side 126 of the crush box 125. The open side 126 of the crush box 125 can face a direction of impact 150. The transition section 140 can include one or more crush boxes 125 formed on both sides of the surface 118, such that their open side 126 faces away from one another (e.g., face in opposite directions). The transition section 140 can include one or more lateral ribs 116. The lateral ribs 116 of the transition section 140 can extend from either side of the surface 118 (e.g., extending towards the first side 104, towards the second side 106, or both). The transition section 140 can include one or more segments 128.

The energy absorber 120 can be configured for attachment to a vehicle. The first side 104 can be a mounting side which can abut a structural element of a vehicle when the energy absorber 120 is attached to the vehicle. The energy absorber 120 can include an opening 121 which can form a hole there through for extending a fastener through and attaching the energy absorber 120 to a structural element of a vehicle (e.g., chassis, frame, rail, and the like).

A segment 128 can include one or more crush boxes 125. A segment 128 can include a longitudinal rib 114 which is offset (e.g., at a different position along at least one of the h-axis or the w-axis in the attached figures) from the longitudinal rib 114 of another segment 128. The lateral rib 116 can have any shape (e.g., an edge 117 of the lateral rib 116 can have a concave shape). In an embodiment, a segment 128 can include a longitudinal rib 114 which is offset (e.g., at a different position along the h-axis) from the longitudinal rib 114 of another segment 128. In an embodiment, an end section 130 can include a single longitudinal rib 114. In an embodiment, an end section 130 can include a single lateral rib 116, such that an upper wall 110 and/or a lower wall 112 form a triangular shape between the surface and the lateral rib (e.g., as in an w-1 plane). In an embodiment, the end section 130 can include an end wall 115 that intersects the surface 118, the longitudinal rib 114, the upper wall 110, the lower wall 112, or a combination including at least one of the foregoing. In an embodiment, the surface 118 can include a shaped portion 139 along an end section 130. The shaped section 139 can have any shape. The upper wall 110 along the shaped section 139 can have a smaller width in comparison to the upper wall 110 along the remainder of the energy absorber 120 and/or in comparison to the lower wall 112. Shaping the energy absorber 120 can allow for a fascia to cover the energy absorber 120 when it is coupled to a vehicle while retaining a desired aesthetic and/or energy absorption functionality.

The energy absorber 120 can be integrally formed (e.g., formed as a single article). For example, the center section 108 can be formed with the two corner energy absorbers 102 in any suitable process, such as injection molding, insert molding, over molding, and the like.

The upper wall 110, the lower wall 112, the longitudinal rib 114, the surface 118, or a combination including at least one of the foregoing can extend continuously throughout the energy absorber 120. As used herein continuously can refer to having dimensional coordinates in at least one dimension that can be described by a continuous function in that dimension. The cross section of the energy absorber 120, taken in a w-h plane, can match where the longitudinal ends 142 meet the transition section 140. The energy absorber 120 can be symmetric about a longitudinal center 80, such that either side of the energy absorber 120 is a mirror image of the opposing side.

The overall performance of the energy absorber (2, 120) can be tuned to achieve the desired energy absorbing characteristic. Tuning as used herein, can refer to the selection of materials, spatial relationship, geometrical configuration, or a combination including at least one of the foregoing to achieve the desired properties of force-displacement characteristics described herein, while optimizing for cost, weight, packaging space, or a combination including at least one of the foregoing. For example, tuning can be achieved by adjusting the dimensions of a rib, wall, or surface along a portion of the energy absorber (e.g., thickness, length, height, width, shape, and the like). The thickness of a rib, wall, or surface can vary along a dimension, such as to allow for ease of manufacturing or to achieve the desired energy absorption when crushed. For example, the upper wall (10, 110) can have a thickness that decreases from the first side (22, 104) to the second side (24, 106). In an embodiment, a lateral rib can extend only partially from the upper wall, longitudinal rib, and/or lower wall, where the lateral rib has a missing section 160 between two adjacent of these elements (upper wall, lower wall, and longitudinal rib).

The upper wall (10, 110) can have a thickness (e.g., as measured in the h-axis dimension of the attached figures) of 1 millimeter (mm) to 10 mm, for example, 1 mm to 5 mm, or 2 mm to 4 mm. The lower wall (12, 112) can have a thickness (e.g., as measured in the h-axis dimension of the attached figures) of 1 mm to 10 mm, for example, 1 mm to 5 mm, or 2 mm to 4 mm.

The longitudinal rib (14, 114) can have a thickness (e.g., as measured in the h-axis dimension of the attached figures) of 1 mm to 10 mm, for example, 1 mm to 5 mm, or 2 mm to 4 mm. The energy absorber (2, 120) can include any number of longitudinal ribs (14, 114), for example 2 to 10 ribs, or, 2 to 8 ribs, or 2 to 4 ribs. The longitudinal ribs (14, 114) can have a spacing (e.g., as measured in the h-axis dimension in the attached figures) of greater than 2 mm from one another, for example, 5 mm to 20 mm, or, 5 mm to 15 mm, or, 5 mm to 10 mm, or 6 mm to 8 mm. The longitudinal ribs (14, 114) can be spaced an equal distance from each other and from the upper and lower walls which can help to minimize stack-up when the crush box (20, 125) is deformed as it absorbs impact energy during a collision. By minimizing stack up (e.g., overlapping of elements the impact direction as the elements deform) the maximum compression of the energy absorber in the direction of impact (50, 150) can be achieved which can allow for maximum energy absorption during a collision. The number of longitudinal ribs (14, 114) can be reduced in the end segments 38 since the desired energy absorption can be reduced along the end sections of the energy absorber (2, 120). In this way, the mass and/or manufacturing cost of the energy absorber can be reduced.

The lateral rib (16, 116) can have a thickness (e.g., as measured in the l-axis dimension of the attached figures) of 1 mm to 10 mm, for example, 1 mm to 5 mm, or 2 mm to 4 mm. The energy absorber (2, 120) can include any number of lateral ribs (16, 116), for example 2 to 50 ribs, or, 10 to 30 ribs, or 15 to 25 ribs. The lateral ribs (16, 116) can have a spacing (e.g., as measured in the l-axis dimension in the attached figures) of greater than 10 mm from one another, for example, 20 mm to 400 mm, or, 40 mm to 200 mm, or, 75 mm to 150 mm, or 80 mm to 120 mm. The spacing between lateral ribs (16, 116) can vary as a function of the length of the energy absorber (2, 120). The lateral ribs (16, 116) can be spaced an equal distance from each other which can help to minimize stack-up when the crush box (20, 125) is deformed as it absorbs impact energy during a collision. The distance between the lateral rib (16, 116) and the end wall (15, 115) can be increased (e.g., relative to the spacing between two adjacent lateral ribs (16, 116) since the desired energy absorption can be reduced along the end sections of the energy absorber (2, 120). In this way, the mass and/or manufacturing cost of the energy absorber can be reduced.

The surface (18, 118) can have a thickness (e.g., as measured along its shortest dimension) of 1 mm to 10 mm, for example, 1 mm to 5 mm, or 2 mm to 4 mm.

The corner energy absorber 2 can have a length (L) of greater than or equal to 100 mm, for example, 100 mm to 1000 mm, or, 200 mm to 800 mm, or, 400 mm to 600 mm. The corner energy absorber 2 can have a width (W) of greater than or equal to 25 mm, for example, 25 mm to 250 mm, or, 50 mm to 200 mm, or, 100 mm to 200 mm. The corner energy absorber 2 can have a height (H) of greater than or equal to 25 mm, for example, 50 mm to 250 mm, or, 50 mm to 200 mm, or, 100 mm to 200 mm.

The center section 108 of the energy absorber 120 can have a length (eg., measured along the l-axis) of greater than or equal to 100 mm, for example, 100 mm to 1000 mm, or, 200 mm to 800 mm, or, 400 mm to 600 mm. The center section 108 of the energy absorber 120 can have a width (e.g., measured along the w-axis) of greater than or equal to 25 mm, for example, 25 mm to 250 mm, or, 50 mm to 200 mm, or, 100 mm to 200 mm. The center section 108 of the energy absorber 120 can have a height (e.g., measured along the h-axis) of greater than or equal to 25 mm, for example, 50 mm to 250 mm, or, 50 mm to 200 mm, or, 100 mm to 200 mm.

The energy absorber 120 can have a length ($L_{EA}$) of greater than or equal to 800 mm, for example, 800 mm to 3000 mm, or, 1000 mm to 2500 mm, or, 1000 mm to 2000 mm. The energy absorber 120 can have a width ($W_{EA}$) of greater than or equal to 25 mm, for example, 25 mm to 250 mm, or, 50 mm to 200 mm, or, 100 mm to 200 mm. The energy absorber 120 can have a height ($H_{EA}$) of greater than or equal to 25 mm, for example, 50 mm to 250 mm, or, 50 mm to 200 mm, or, 100 mm to 200 mm.

For each vehicle, the particular dimensions (i.e., length, width and height) of the energy absorber will be more or less be prescribed by the package space between the rear back plate and rear fascia. Those dimensions and shape of the volume will depend upon vehicle styling.

The length, width, height, thickness, spacing, shape, or a combination including at least one of the forgoing of the elements of the energy absorbers described herein (e.g., including the upper wall, lower wall, longitudinal ribs, lateral ribs, crush box, segment, end wall, surface, and the like) can vary as a function of at least one spatial dimension. For example, the width of the energy absorber 120 can vary as a function of its length and/or height. In an embodiment, the width (W, $W_{EA}$) of the energy absorber (2, 120) can vary along at least one of its length (L, $L_{EA}$) and its height ($H_{EA}$). In an embodiment, the width (W, $W_{EA}$) and the height (H, $H_{EA}$) of the energy absorber (2, 120) can vary its length (L, $L_{EA}$).

The energy absorber (2, 120) can be made of a material including a polymer, a reinforcing material, reinforced composite polymer material, a metal or a combination including at least one of the foregoing. As used herein a metal can include steel, aluminum, magnesium, another structural metal, or a combination including at least one of the foregoing. As used herein, a reinforcing material can include fibers, (continuous, chopped, woven, and the like) formed of aramid, carbon, basalt, glass, plastic, metal (e.g. steel, aluminum, magnesium), quartz, boron, cellulose, liquid crystal polymer, high tenacity polymer (e.g., polypropylene, polyethylene, poly(hexano-6-lactam), poly[imino(1,6-dioxohexamethylene) imnohexamethylene], thermoplastic polymer, thermoset polymer, or natural fibers, as well as combinations including at least one of the foregoing.

Possible polymer materials that can be used in the manufacture of the energy absorber (2,120) and/or the elements thereof include thermoplastic resins. Thermoplastic resins that can be employed include, but are not limited to, oligomers, polymers, ionomers, dendrimers, copolymers such as graft copolymers, block copolymers (e.g., star block copolymers, random copolymers, and the like) and combinations comprising at least one of the foregoing. Examples of such thermoplastic resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates (PMMA)), polyesters (e.g., copolyesters, polythioesters), polyolefins (e.g., polypropylenes (PP) and polyethylenes, high density polyethylenes (HDPE), low density polyethylenes (LDPE), linear low density polyethylenes (LLDPE)), polyamides (e.g., polyamideimides), polyarylates, polysulfones (e.g., polyarylsulfones, polysulfonamides), polyphenylene sulfides, polytetrafluoroethylenes, polyethers (e.g., polyether ketones (PEK), polyether etherketones (PEEK), polyethersulfones (PES)), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidones, polycarboranes, polyoxabicyclononanes, polydibenzofurans, polyphthalamide, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazanes, polysiloxanes, fluoropolymers (e.g., polyvinyl fluouride (PVF), polyvinylidene fluoride (PVDF), polyvinyl fluoride (PVF), fluorinated ethylene-propylene (FEP), polyethylene tetrafluoroethylene (ETFE)) and combinations comprising at least one of the foregoing.

More particularly, the thermoplastic resin which can be used in the hybrid UPD and elements thereof can include polycarbonate resins (e.g., Lexan™ resins, commercially available from SABIC's Innovative Plastics business), polyphenylene ether-polystyrene resins (e.g., Noryl™ resins, commercially available from SABIC's Innovative Plastics business), polyetherimide resins (e.g., Ultem™ resins, commercially available from SABIC's Innovative Plastics business), polybutylene terephthalate-polycarbonate resins (e.g., Xenoy™ resins, commercially available from SABIC's Innovative Plastics business), copolyestercarbonate resins (e.g. Lexan™ SLX resins, commercially available from SABIC's Innovative Plastics business), and combinations comprising at least one of the foregoing resins. Even more particularly, the thermoplastic resins can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate), and combinations comprising at least one of the foregoing, for example, a combination of branched and linear polycarbonate.

The polymer material can include various additives ordinarily incorporated into polymer compositions of this type, with the proviso that the additive(s) are selected so as to not significantly adversely affect the desired properties of the sheet, in particular, deflection, stress, and flexural stiffness. Such additives can be mixed at a suitable time during the forming of the components. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants (such as carbon black and organic dyes), surface effect additives, radiation stabilizers (e.g., infrared absorbing), flame retardants, and anti-drip agents. A combination of additives can be used, for example a combination of a heat stabilizer, mold release agent, and ultraviolet light stabilizer. The total amount of additives (other than any impact modifier, filler, or reinforcing agents) can be 0.001 wt. % to 5 wt. %, based on the total weight of the composition of the plastic component (e.g., the mating portion of the thermoplastic beam or the plastic portion of the hybrid bracket).

In addition to flexural stiffness, deflection, and lower edge stress, the polymeric material can be chosen to exhibit sufficient impact resistance such that the plastic can resist breakage (e.g., cracking, fracture, and the like) caused by a vehicle impact.

Any of the foregoing polymer materials can be used in a reinforced composite polymer material with the incorporation of reinforcing material.

EXAMPLES

Figure 5:
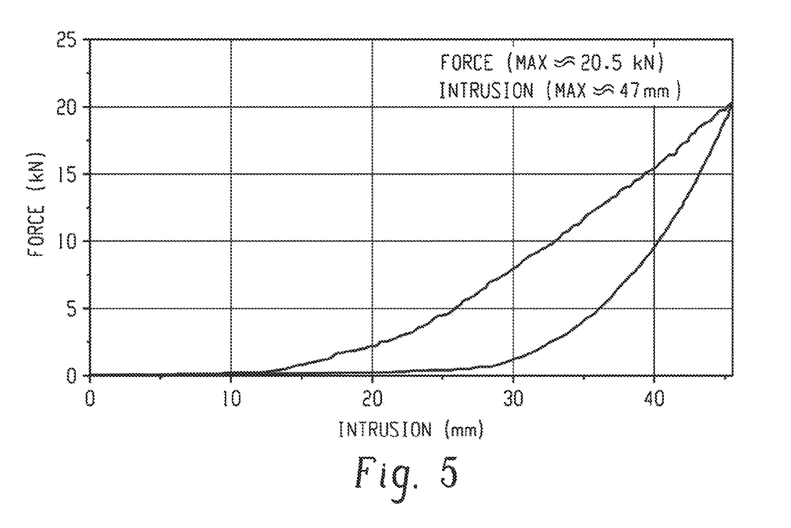
FIG. 5 is a graphical illustration of force versus intrusion performance for a simulated ECE 42 center pendulum impact of an energy absorber.
Figure 6:
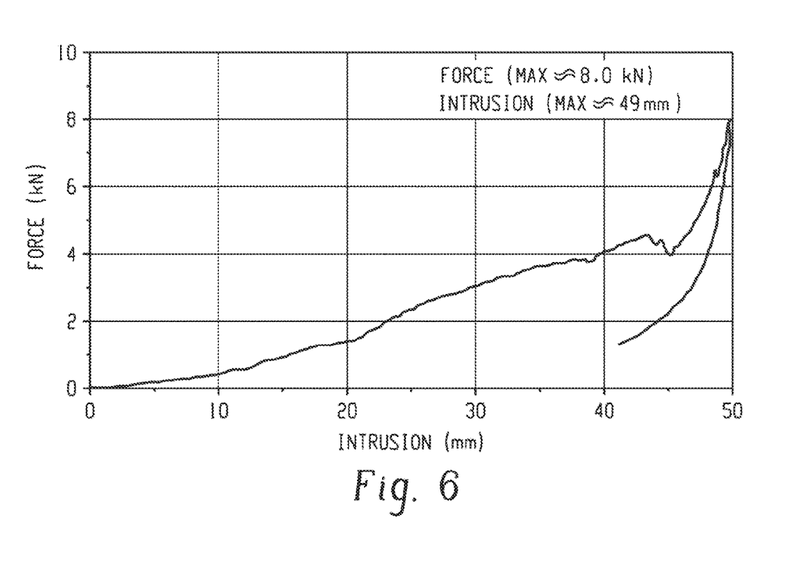
FIG. 6 is a graphical illustration of force versus intrusion performance for a simulated ECE 42 corner pendulum impact of a corner energy absorber.

A computer simulation of a 950 kilogram (kg) vehicle having an energy absorber 120 having a mass of approximately 1.3 kg coupled to the rear end of the vehicle was used to determine the intrusion performance. Two simulations consistent with the requirements of ECE 42 for center and corner pendulum impacts were performed. The first simulation was of a 4.0 kilometer per hour (kph) center pendulum impact. The second simulation was of a 2.5 kph corner pendulum impact. The results of this simulation are provided in Table 1, where the Total Impact Energy and the Energy Absorbed are presented in units of Joules (J), the Force in units of kilo-newtons (kN), and the Intrusion in millimeters (mm). Corresponding performance curves are shown in FIGS. 5 and 6.

TABLE 1

ECE 42 Force And Intrusion Results For
A Vehicle With An Energy Absorber
Including Center Section Having A Mass Of 1.3 kg

| Impact Case | Total Impact Energy (J) | Energy Absorbed (J) | Force (kN) | Intrusion (mm) | Remarks |
|---|---|---|---|---|---|
| ECE 42 18" Center Pendulum 4.0 kph | 570 | 285 | 20.5 | 47 | Performs well |
| ECE 42 18" Corner Pendulum 2.5 kph | 230 | 230 | 8.0 | 49 | Performs well |

A computer simulation of a 950 kg vehicle having two corner energy absorbers 2 having a combined mass of approximately 1.1 kg coupled to opposing sides of the rear end of the vehicle was used to determine the intrusion performance. Two simulations consistent with the requirements of ECE 42 for center and corner pendulum impacts were performed. The first simulation was of a 4.0 kilometer per hour (kph) center pendulum impact. The second simulation was of a 2.5 kph corner pendulum impact. The results of this simulation are provided in Table 1 where the Total Impact Energy and the Energy Absorbed are presented in units of Joules (J), the Force in units of kilo-newtons (kN), and the Intrusion in millimeters (mm). Performance curves are not shown in the Figure for these simulations. The extended sections of the two corner energy absorbers can provide support for center impact, while also supporting and receiving an impactor 10 to 15% overlap from each side

TABLE 2

ECE 42 Force And Intrusion Results For
A Vehicle With Two Corner Energy
Absorbers Having A Combined Mass Of 1.1 kg

| Impact Case | Total Impact Energy (J) | Energy Absorbed (J) | Force (kN) | Intrusion (mm) | Remarks |
|---|---|---|---|---|---|
| ECE 42 18" Center Pendulum 4.0 kph | 570 | 285 | 13.3 | 59 | Performs well |
| ECE 42 18" Corner Pendulum 2.5 kph | 230 | 230 | 5.4 | 67 | Performs well |

This data shows an evaluation on a generic vehicle test set to meet ECE 42 regulations.

Unless otherwise specified herein, any reference to standards, regulations, testing methods and the like, such as ECE 42 and RCAR refer to the standard or method that is in force at the time of filing of the present application.

The present invention is further illustrated by the following embodiments.

Embodiment 1

An energy absorber for a vehicle, comprising: a continuous beam to extend across a width of vehicle, the beam defining a plurality of inward facing cavities in a center section, with adjacent inward facing cavities separated from one another by an inward facing rib(s) (e.g., by a plurality of inward facing ribs), and at each end portion a plurality of outward facing cavities, with adjacent outward facing cavities separated from one another by an outward facing rib (e.g., by a plurality of outward facing ribs), wherein the center section includes a panel that is continuous on its outward side, and that forms a relative bottom of each of the plurality of inward facing cavities with its inward face.

Embodiment 2

The energy absorber of Embodiment 1, wherein each of the end portions forms a respective crash can.

Embodiment 3

The energy absorber of any of the Embodiments 1-2, where each of the end portions defines a convex shape in a top view, the convex shape opening outward.

Embodiment 4

The energy absorber of any of the Embodiments 1-3, wherein a datum connecting the ends of the beam is located outward of the panel.

Embodiment 5

A corner energy absorber comprising: an upper wall; a lower wall; a longitudinal rib disposed between the upper wall and lower wall; wherein the longitudinal rib does not intersect at least one of the upper wall and the lower wall; a lateral rib extending between the upper wall and the lower wall, and intersecting the longitudinal rib; and a surface that intersects the upper wall, the lower wall, the longitudinal rib, and the lateral rib and forms a crush box; wherein the surface extends along a first side along an end section; wherein the surface crosses from the first side to a second side along a transition section; wherein the transition section comprises one or more crush boxes on both sides of the surface that have open sides facing away from one another; wherein the energy absorber is formed as a single article; and wherein the energy absorber is configured for attachment to a vehicle.

Embodiment 6

The corner energy absorber of Embodiment 5, comprising two longitudinal ribs along a portion of the end section and wherein the longitudinal ribs are equally spaced between the upper wall and the lower wall.

Embodiment 7

The corner energy absorber of any of Embodiments 5-6, wherein the lower wall has a length which is greater than or equal to the length of the upper wall.

Embodiment 8

The corner energy absorber of any of Embodiments 5-7, wherein a longitudinal rib has a convex shape in a plane defined by a height dimension and a thickness dimension of the energy absorber Embodiment 9

The corner energy absorber of any of Embodiments 5-8, wherein a first thickness at a first cross-section of the end section is less than a second thickness at a second portion of the end section, wherein the first cross-section and second cross-section are taken in a plane defined by a height dimension and a thickness dimension of the energy absorber.

Embodiment 10

The corner energy absorber of Embodiment 9, wherein a third thickness at a third cross-section of the end section is greater than both the first thickness and the second thickness, wherein the third cross-section is taken in a plane defined by a height dimension and a thickness dimension of the energy absorber.

Embodiment 11

The corner energy absorber of any of Embodiments 5-10, wherein the lateral rib and the longitudinal rib are perpendicular to one another.

Embodiment 12

The corner energy absorber of any of Embodiments 5-11, wherein the energy absorber is configured for attachment to an end of a vehicle side rail.

Embodiment 13

The corner energy absorber of any of Embodiments 5-12, wherein the surface comprises a concave cross-sectional shape in a plane defined by a length dimension and a thickness dimension of the energy absorber.

Embodiment 14

The corner energy absorber of any of Embodiments 5-13, wherein the open side of the crush boxes of the end section face a direction of impact.

Embodiment 15

The corner energy absorber of any of Embodiments 5-14, wherein the first side is a mounting side and the second side is an impact side of the energy absorber when the energy absorber is in use.

Embodiment 16

The corner energy absorber of any of Embodiments 5-15, wherein an end crush box which is formed furthest away from the transition section, comprises a single lateral rib such that it has a triangular shape in a plane defined by a length dimension and a thickness dimension.

Embodiment 17

The corner energy absorber of any of Embodiments 5-16, wherein the surface does not extend above the upper wall or below the lower wall.

Embodiment 18

The corner energy absorber of any of Claim Embodiments 5-17, wherein the surface comprises a concave shape along the end section and comprises a straight shape along the transition section in a plane defined by a length dimension and a thickness dimension of the energy absorber.

Embodiment 19

The corner energy absorber of any of Embodiments 5-18, wherein the longitudinal rib does not intersect the upper wall or the lower wall.

Embodiment 20

The corner energy absorber of any of Embodiments 5-19, wherein an end segment comprises a single longitudinal rib which extends beyond upper wall.

Embodiment 21

The corner energy absorber of any of Embodiments 5-20, comprising greater than five lateral ribs and wherein at least one of the lateral ribs has a concave shape in a plane defined by a width dimension and a height dimension of the energy absorber.

Embodiment 22

The corner energy absorber of any of Embodiments 5-21, comprising seven lateral ribs.

Embodiment 23

The corner energy absorber of any of Embodiments 5-22, wherein the corner energy absorber has a mass of less than or equal to 1.3 kilograms (kg) and absorbs greater than or equal to 225 Joules (J) of energy and intrudes less than or equal to 67 millimeter (mm) when subjected to a corner impact of greater than or equal to 230 J resulting from a 2.5 kilometer per hour (kph) collision with an 18 inch (in.) pendulum.

Embodiment 24

The corner energy absorber of any of Embodiments 5-23, wherein the corner energy absorber has a mass of less than or equal to 1.3 kilograms (kg) and absorbs greater than or equal to 280 Joules (J) of energy and intrudes less than or equal to 59 millimeter (mm) when subjected to a center impact of greater than or equal to 570 J resulting from a 4.0 kilometer per hour (kph) collision with an 18 inch (in.) pendulum.

Embodiment 25

An energy absorbing system for a vehicle comprising: two corner energy absorbers of any of claims 1-20, wherein each of the corner energy absorbers is coupled to a structural element of the vehicle on opposing corners of the vehicle.

Embodiment 26

The energy absorbing system of Embodiment 25, wherein the opposing corners are on the rear end of the vehicle.

Embodiment 27

The energy absorbing system of any of Embodiments 25-26, wherein the two corner energy absorbers are mirror images or one another.

Embodiment 28

An energy absorber comprising: an upper wall; a lower wall; a longitudinal rib disposed between the upper wall and lower wall; wherein the longitudinal rib does not intersect the upper wall or the lower wall; a lateral rib extending between the upper wall and the lower wall, and intersecting the longitudinal rib; and a surface that intersects the upper wall, the lower wall, the longitudinal rib, and the lateral rib and forms a crush box; wherein the surface extends along a first side along each of two end sections; wherein the surface crosses from the first side to a second side along each of two transition sections adjacent the end sections; wherein the surface extends along the second side along a center section; wherein the transition section comprises one or more crush boxes on both sides of the surface that have open sides facing away from one another; wherein the energy absorber is formed as a single article; and wherein the energy absorber is configured for attachment to a vehicle.

Embodiment 29

An energy absorber comprising: two corner energy absorbers of any of Embodiments 5-24; and a center section having two longitudinal ends; wherein each longitudinal end is coupled to the transition section of one of the corner energy absorbers, wherein the upper wall, the lower wall, the longitudinal rib, and the surface extend through the center section; and wherein the center section comprises the lateral ribs which intersect the upper wall, the lower wall, and the longitudinal rib.

Embodiment 30

The energy absorber of any of Embodiments 28-29, wherein the open side of the crush boxes of the end section face a direction of impact, the open side of the crush boxes of the center section face in a direction that is opposite of the direction of impact.

Embodiment 31

The energy absorber of any of Embodiments 28-30, comprising two longitudinal ribs; wherein the longitudinal ribs are equally spaced between the upper wall and the lower wall.

Embodiment 32

The energy absorber of any of Embodiments 28-31, wherein an end crush box which is formed furthest away from a longitudinal center of the energy absorber, comprises a single lateral rib such that it has a triangular shape in a plane defined by a length dimension and a thickness dimension.

Embodiment 33

The energy absorber of any of Embodiments 28-32, wherein the surface does not extend above the upper wall or below the lower wall.

Embodiment 34

The energy absorber of any of Embodiments 28-33, wherein the surface has a concave shape along the end section, a convex shape along the center section and is straight along the transition section in a plane defined by a length dimension and a thickness dimension of the energy absorber.

Embodiment 35

The energy absorber of any of Embodiments 28-34, wherein the surface is straight along the end section, straight along the center section and is straight along the transition section in a plane defined by a length dimension and a thickness dimension of the energy absorber.

Embodiment 36

The energy absorber of any of Embodiments 28-35, wherein the energy absorber has a mass of less than or equal to 1.5 kilograms (kg) and absorbs greater than or equal to 225 Joules (J) of energy and intrudes less than or equal to 56 millimeter (mm) when subjected to a corner impact of greater than or equal to 230 J resulting from a 2.5 kilometer per hour (kph) collision with an 18 inch (in.) pendulum.

Embodiment 37

The energy absorber of any of Embodiments 28-36, wherein the energy absorber has a mass of less than or equal to 1.5 kilograms (kg) and absorbs greater than or equal to 280 Joules (J) of energy and intrudes less than or equal to 39 millimeter (mm) when subjected to a center impact of greater than or equal to 570 J resulting from a 4.0 kilometer per hour (kph) collision with an 18 inch (in.) pendulum.

Embodiment 38

The energy absorber of any of Embodiments 5-37, wherein the energy absorber further comprises a polycarbonate, polybutylene terephthalate, polyetherimide, polyethylene tetrafluoroethylene, polyurea, polyphosphazene, polysilazane, polysiloxanes, fluoropolymer, polyether, polytetrafluoroethylene, polyphenylene sulfide, polyphenylene ether, polysulfone, polyarylate, polyamide, polyester, polyolefin, polyacrylate, acrylonitrile-styrene-butadiene, polyetherimide, polyimide, polyphenylene, polystyrene, polybutadiene, an ionomer thereof, a copolymer thereof, or a combination comprising at least one of the foregoing.

Embodiment 39

The energy absorber of any of Embodiments 5-38, wherein the energy absorber further comprises a reinforcing material comprising glass fibers, aramid fibers, thermoplastic fibers, carbon fibers, basalt fibers, high tenacity polymer fibers, or a combination of at least one of the foregoing.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. An energy absorber for a vehicle, comprising:
   a continuous beam to extend across a width of vehicle, the beam defining a plurality of inward facing cavities in a center section, with adjacent inward facing cavities separated from one another by an inward facing rib, and at each end portion a plurality of outward facing cavities, with adjacent outward facing cavities separated from one another by an outward facing rib,
   wherein the center section includes a panel that is continuous on an outward side of the panel, and that forms a relative bottom of each of the plurality of inward facing cavities with an inward face of the panel; and
   wherein each of the end portions forms a respective crash can.

2. The energy absorber of claim 1, where each of the end portions defines a convex shape in a top view, the convex shape opening outward.

3. A corner energy absorber comprising:
   an upper wall;
   a lower wall;
   a longitudinal rib disposed between the upper wall and lower wall; wherein the longitudinal rib does not intersect at least one of the upper wall and the lower wall;
   a lateral rib extending between the upper wall and the lower wall, and intersecting the longitudinal rib; and
   a surface that intersects the upper wall, the lower wall, the longitudinal rib, and the lateral rib and forms a crush box;
   wherein the surface extends along a first side along an end section;
   wherein the surface crosses from the first side to a second side along a transition section;
   wherein the transition section comprises one or more crush boxes on both sides of the surface that have open sides facing away from one another;
   wherein the energy absorber is formed as a single article; and
   wherein the energy absorber is configured for attachment to a vehicle.

4. The corner energy absorber of claim 3, comprising two longitudinal ribs along a portion of the end section and wherein the longitudinal ribs are equally spaced between the upper wall and the lower wall.

5. The corner energy absorber of claim 3, wherein a longitudinal rib has a convex shape in a plane defined by a height dimension and a thickness dimension of the energy absorber.

6. The corner energy absorber of claim 3, wherein a first thickness at a first cross-section of the end section is less than a second thickness at a second portion of the end section, wherein the first cross-section and second cross-section are taken in a plane defined by a height dimension and a thickness dimension of the energy absorber.

7. The corner energy absorber of claim 3, wherein the energy absorber is configured for attachment to an end of a vehicle side rail.

8. The corner energy absorber of claim 3, wherein the surface comprises a concave cross-sectional shape in a plane defined by a length dimension and a thickness dimension of the energy absorber.

9. The corner energy absorber of claim 3, wherein an end crush box which is formed furthest away from the transition section, comprises a single lateral rib such that the crush box has a triangular shape in a plane defined by a length dimension and a thickness dimension.

10. The corner energy absorber of claim 3, wherein the surface comprises a concave shape along the end section and comprises a straight shape along the transition section in a plane defined by a length dimension and a thickness dimension of the energy absorber.

11. The corner energy absorber of claim 3, wherein the longitudinal rib does not intersect the upper wall or the lower wall.

12. The corner energy absorber of claim 3, comprising greater than five lateral ribs and wherein at least one of the lateral ribs has a concave shape in a plane defined by a width dimension and a height dimension of the energy absorber.

13. The corner energy absorber of claim 3, wherein the corner energy absorber has a mass of less than or equal to 1.3 kilograms (kg) and absorbs greater than or equal to 225 Joules (J) of energy and intrudes less than or equal to 67 millimeter (mm) when subjected to a corner impact of greater than or equal to 230 J resulting from a 2.5 kilometer per hour (kph) collision with an 18 inch (in.) pendulum.

14. An energy absorbing system for a vehicle comprising two corner energy absorbers of claim 3, wherein each of the corner energy absorbers is coupled to a structural element of the vehicle on opposing corners of the vehicle.

15. The energy absorbing system of claim 14, wherein the opposing corners are on the rear end of the vehicle.

16. The energy absorbing system of claim 14, wherein the two corner energy absorbers are mirror images or one another.

17. An energy absorber comprising:
two corner energy absorbers of claim 3; and
a center section having two longitudinal ends;
wherein each longitudinal end is coupled to the transition section of one of the corner energy absorbers, wherein the upper wall, the lower wall, the longitudinal rib, and the surface extend through the center section; and
wherein the center section comprises the lateral ribs which intersect the upper wall, the lower wall, and the longitudinal rib.

18. The energy absorber of claim 17, wherein the open side of the crush boxes of the end section face a direction of impact, the open side of the crush boxes of the center section face in a direction that is opposite of the direction of impact.

* * * * *